(12) United States Patent
Baumann et al.

(10) Patent No.: US 8,853,587 B2
(45) Date of Patent: Oct. 7, 2014

(54) WIRE ELECTRODE FOR ELECTRICAL DISCHARGE CUTTING

(75) Inventors: Ingo Baumann, Greifenstein (DE); Tobias Nöthe, Herborn (DE)

(73) Assignee: Berkenhoff GmbH (DE)

( * ) Notice: Subject to any disclaimer, the term of this patent is extended or adjusted under 35 U.S.C. 154(b) by 401 days.

(21) Appl. No.: 13/132,291

(22) PCT Filed: Nov. 26, 2009

(86) PCT No.: PCT/EP2009/008435
§ 371 (c)(1),
(2), (4) Date: Aug. 19, 2011

(87) PCT Pub. No.: WO2010/063410
PCT Pub. Date: Jun. 10, 2010

(65) Prior Publication Data
US 2011/0290531 A1    Dec. 1, 2011

(30) Foreign Application Priority Data
Dec. 3, 2008 (EP) ..................................... 08170563

(51) Int. Cl.
*B23H 7/08* (2006.01)
*B23H 1/06* (2006.01)

(52) U.S. Cl.
CPC ........................................ *B23H 7/08* (2013.01)
USPC ........................................ 219/69.12; 428/674

(58) Field of Classification Search
USPC ............ 219/69.12, 69.15; 148/518, 536, 434; 428/658, 674
See application file for complete search history.

(56) References Cited

U.S. PATENT DOCUMENTS

| 4,686,153 A | 8/1987 | Tominaga et al. |
| 4,713,216 A | 12/1987 | Higashi et al. |
| 4,837,416 A | 6/1989 | Yamamoto et al. |
| 4,935,594 A | 6/1990 | Groos et al. |
| 4,968,867 A | 11/1990 | Banzai et al. |

(Continued)

FOREIGN PATENT DOCUMENTS

| DE | 19510740 A1 | 10/1996 |
| EP | 0733431 A1 | 9/1996 |
| EP | 0733431 B1 | 9/1996 |
| EP | 0734805 A1 | 10/1996 |

(Continued)

OTHER PUBLICATIONS

"International Application Serial No. PCT/EP2009/008435, International Search Report mailed May 6, 2010", (w/ English Translation), 6 pgs.

(Continued)

*Primary Examiner* — Geoffrey S Evans
(74) *Attorney, Agent, or Firm* — Schwegman, Lundberg & Woessner, P.A.

(57) ABSTRACT

A wire electrode for cutting by electrical discharge machining may include a core and a covering. The core may include a metal or a metal alloy. The covering may surround the core and may include one or more covering layers, of which at least one contains a mixture of phases including at least one of $\beta$ or $\beta'$ brass and including $\gamma$ brass. In the at least one covering layer that contains the mixture, the phases are present next to one another in a fine-grained microstructure having a mean grain size of 5 µm or less in section perpendicular to the longitudinal axis of the wire electrode.

18 Claims, 2 Drawing Sheets

(56) References Cited

U.S. PATENT DOCUMENTS

| | | | |
|---|---|---|---|
| 4,977,303 | A | 12/1990 | Briffod |
| 5,721,414 | A | 2/1998 | Lacourcelle |
| 5,762,726 | A * | 6/1998 | Barthel et al. ............... 148/536 |
| 5,808,262 | A * | 9/1998 | Mukherjee ................ 219/69.12 |
| 5,945,010 | A * | 8/1999 | Tomalin .................... 219/69.12 |
| 6,176,994 | B1 | 1/2001 | Lacourcelle |
| 6,447,930 | B2 | 9/2002 | Barthel et al. |
| 6,566,622 | B1 | 5/2003 | Barthel et al. |
| 6,676,899 | B2 | 1/2004 | Davydov et al. |
| 6,781,081 | B2 * | 8/2004 | Groos et al. ............... 219/69.12 |
| 6,794,597 | B2 | 9/2004 | Groos et al. |
| 8,378,247 | B2 | 2/2013 | Blanc et al. |
| 2002/0195427 | A1 | 12/2002 | Miyoshi |
| 2003/0057189 | A1 * | 3/2003 | Groos et al. ............... 219/69.12 |
| 2005/0040141 | A1 | 2/2005 | Ly |
| 2006/0219666 | A1 * | 10/2006 | Shin .......................... 219/69.12 |
| 2008/0061038 | A1 | 3/2008 | Blanc |
| 2008/0179296 | A1 | 7/2008 | Ly et al. |
| 2009/0025959 | A1 | 1/2009 | Tomalin |
| 2011/0226743 | A1 | 9/2011 | Nuthe |

FOREIGN PATENT DOCUMENTS

| | | |
|---|---|---|
| EP | 0955396 A1 | 11/1999 |
| EP | 1038625 A2 | 9/2000 |
| EP | 1295664 A1 | 3/2003 |
| EP | 1295663 B1 | 5/2007 |
| EP | 1949995 A1 | 7/2008 |
| EP | 2193867 B1 | 6/2012 |
| FR | 2881974 A1 | 8/2006 |
| JP | 5-337741 A | 12/1993 |
| JP | 2002-126949 | 5/2002 |
| JP | 2005-254408 | 9/2005 |
| WO | WO2006/085006 | 8/2006 |
| WO | WO-2006/085006 A1 | 8/2006 |

OTHER PUBLICATIONS

"Joint de grain", [online]. Wikipedia®. [retrieved on Mar. 19, 2013]. Retrieved from the Internet: <URL: http://fr.wikipedia.org/wiki/Joint_de_grain>, (w/ English Translation), (2013), 2 pgs.

"U.S. Appl. No. 13/073,541, Non Final Office Action mailed Jul. 31, 2013", 7 pgs.

"U.S. Appl. No. 13/073,541, Response filed Dec. 2, 2013 to Non Final Office Action mailed Jul. 31, 2013", 8 pgs.

"Client Summary", Exhibit D9 to Opecmade's Notice of Opposition, (Mar. 20, 2013), 9 pgs.

"Declaration of Michel Ly" Mar. 18, 2013), 1 pg.

"European Application Serial No. EP08165663, European Search Report dated Nov. 7, 2008", 3 pgs.

"European Application Serial No. EP08170563.4, European Search Report mailed May 20, 2009", 8 pgs.

"European Application Serial No. EP08170563.4, Request for Amendment filed Apr. 3, 2012", 2 pgs.

"European Application Serial No. EP08170563.4, Response filed Dec. 8, 2010", 21 pgs.

"Grain boundary", [online]. Wikipedia(r), the free encyclopedia. Retrieved from the Internet: <URL: http://en.wikipedia.org/wiki/Grain_boundary> (last modified on Dec. 5, 2013), (2013), 5 pgs.

"International Application Serial No. PCT/EP2009/006148, International Search Report mailed Nov. 5, 2009", 4 pgs.

"International Application Serial No. PCT/EP2009/006148, Written Opinion mailed Nov. 5, 2009", (w/ English Translation), 8 pgs.

"Machine Translation of JP 2005-254408A, published Sep. 22, 2005", 30 pgs.

"Notice of Opposition filed Mar. 19, 2013 by Heinrich Stamm GmbH", 12 pgs.

"Notices of Opposition filed Mar. 20, 2013 by Opecmade, Inc., EDM, Mart Co., Ltd. and Thermocompact", (w/ Partial English Translation), 70 pgs.

"Reply of Berkenhoff GmbH filed Nov. 11, 2013 to Notices of Oppositions", 24 pgs.

"Report—Opposition of EP 2193867B1", (Mar. 19, 2013), 5 pgs.

"U.S. Appl. No. 13/073,541, Non Final Office Action mailed Mar. 10, 2014", 9 pgs.

* cited by examiner

WIRE ELECTRODE FOR ELECTRICAL DISCHARGE CUTTING

PRIORITY CLAIM AND RELATED APPLICATIONS

This application is a nationalization under 35 U.S.C. 371 of PCT/EP2009/008435, filed Nov. 26, 2009 and published as WO 2010/063410 A1 on Jun. 10, 2010, which claimed priority under 35 U.S.C. 119 to European Patent Application No. 09170563.4, filed Dec. 3, 2008; which applications and publication are incorporated herein by reference in their entirety.

The present invention relates to a wire electrode for cutting by electrical discharge machining, or spark-erosion cutting, having a core, which comprises a metal or a metal alloy, and a covering or coating which surrounds the core and comprises one or more covering or coating layers, of which at least one contains a phase mixture of $\beta$ and/or $\beta'$ brass and $\gamma$ brass, as well as to a method for producing such a wire electrode.

Electrical discharge machining (EDM) methods, or spark-erosion methods, are used for separating electrically conductive workpieces, and are based on the removal of material by means of spark discharges between the workpiece and a tool. For this purpose, in a dielectric liquid such as, for example, deionized water or an oil, controlled spark discharges are produced between the respective workpiece and the tool, which is disposed at a short distance therefrom and which acts as an electrode, through the application of voltage pulses. In this manner, workpieces consisting, for example, of metals, electrically conductive ceramics or composite materials etc. can be machined substantially irrespective of their hardness.

A special electrical discharge machining method, in which the tool is constituted by a tensioned, thin wire having typical diameters in a range from approximately 0.02 to 0.4 mm, is that of cutting by electrical discharge machining (spark-erosive cutting) or wire erosion. Since the wire wears during the eroding process as a result of the removal of material, it has to be continuously drawn through the cutting, or machining, zone and can only be used once, i.e. the wire is consumed continuously.

In practice, use is made of both coated and uncoated wires or wire electrodes, which nowadays are usually produced on the basis of brass or copper. Uncoated wire electrodes, which are also referred to as bare or blank wires, are composed of a homogeneous material, while coated wire electrodes have a covered, or coated, core. In the prior art, coated wire electrodes are normally constructed such that a jacket, covering or covering, which can be composed of a covering or coating layer or a plurality of covering or coating layers arranged one on top of another, is responsible for the actual erosion process, whereas the core of the wire electrode, for example, imparts the tensile strength, necessary for the through-passage of the wire and for the wire pretensioning, and the necessary electrical and thermal conductivity to the wire electrode.

Bare wires typically consist of brass having a zinc content of between 35 and 40% by weight, whereas most coated wires comprise a core of copper or brass and one or more covering layers of zinc or a copper-zinc alloy. As materials involved in the actual eroding process, zinc and brass, owing to the presence of zinc and the ease of vaporization resulting therefrom, offer the advantages of a relatively high removal rate and efficiency of the eroding process, and the possibility of the transfer of very small pulse energies for the fine finishing of workpiece surfaces.

In the case of bare brass wires, the increase in the zinc content is subjected to limits, since the cold forming required for economic processability is no longer possible above a specific zinc content because the proportion of brittle phases in the microstructure increases as the zinc content rises.

It is known that, compared to these bares wires, the cutting performance can therefore be increased by using wires which are provided with a covering or coating of pure or predominantly pure zinc. Furthermore, it is known that wires having a coating of brass comprising $\beta$ phase or $\beta'$ phase achieve a yet higher cutting performance than the zinc-coated wires mentioned above, since the zinc bound in the $\beta$ brass alloy or $\beta'$ brass alloy vaporizes more slowly compared to pure zinc, and is therefore available promoting material removal for an adequate amount of time as the wire passes the cutting or machining zone. Furthermore, the zinc content of the covering can be increased further using wires having a coating of the $\gamma$ phase and/or the $\in$ phase of the brass, and in principle it is possible to achieve identical or higher cutting performances compared to the aforementioned wires having a coating of $\beta$ brass or $\beta'$ brass. In conjunction with coatings of brittle phases, such as the $\gamma$ phase, it has been found here, however, that firstly an increase in the layer thickness does not necessarily lead to a further increase in performance (cf. EP 1 295 664), and secondly the formability or workability of thicker layers is subjected to limits, with disadvantages for economic producibility (cf. U.S. Pat. No. 5,945,010). Furthermore, $\gamma$ brass coatings experience greater wear than $\beta$ brass coatings, which in practice often reduces again the cutting performance.

Further developments for increasing the cutting performance primarily involve combinations of different ones of the covering layers mentioned, if appropriate with further layers, in a multi-layered covering or coating and also, for example, the use of various surface effects. In this regard, jackets comprising a brass covering layer comprising a phase mixture of, for example, $\alpha$ phase and $\beta$ phase or of $\beta$ phase and $\gamma$ phase have also occasionally been proposed, in some cases compulsorily owing to diffusion processes which take place during the corresponding production processes. By way of example, in EP 1 038 625 a wire electrode is described the covering of which comprises an inner covering layer, which, inter alia, can have a homogeneous $\beta$ and/or $\gamma$ structure. By means of the choice of such a structure a face-centered cubic crystal lattice with the aforementioned stronger inclusion of the zinc atoms in the lattice is intended to be provided.

In general, there is the need to increase the economic viability of the wire eroding technique by improving the cutting performance and erosion resistance further.

It is accordingly an object of the present invention to provide a wire electrode having an improved cutting performance and erosion resistance.

According to the present invention, it is provided that a wire electrode for cutting by electrical discharge machining, or spark-erosion cutting, has a core which comprises a metal or a metal alloy. Here, it is preferable for the core to consist to an extent of more than 50% by weight and more preferably completely or essentially completely of one or more metals and/or one or more metal alloys. In particular, the core can accordingly be formed entirely from a metal or from a metal alloy. The core can be formed so as to be homogeneous or, for example in the form of a plurality of individual metal or metal alloy layers of differing composition arranged one on top of another, can have properties that vary in the radial direction.

Surrounding or encompassing the core is a jacket or covering, for example in the form of a coating, which comprises one or more covering layers. The covering is intended to wear during a wire eroding process. In the case of a plurality of covering layers, these are arranged one on top of another in the radial direction, and each layer preferably extends surrounding or encompassing the core. Here, provision is made of one or more covering layers which comprise a phase mixture of β and/or β' brass and γ brass. Accordingly, this single covering layer or this plurality of covering layers can respectively contain, for example, β phase and γ phase, β' phase and γ phase or else β phase, β' phase and γ phase.

In this context, it should be mentioned that the β' phase is stable below a certain temperature and has an ordered lattice with defined lattice sites for the copper and the zinc and, if this temperature is exceeded, passes into the unordered β phase, in which the atoms are distributed statistically onto the lattice sites of a body-centered cubic lattice. Since, according to prevailing opinion, the conversion between the β phase and the β' phase cannot be suppressed and further has only a minor impact on the mechanical and electrical properties thereof, a general reference to the β phase also always means the β' phase within the context of this application, unless a distinction is expressly made.

Since β' brass, β brass and γ brass, as indicated above, advantageously contribute to an increase in the cutting performance, it is particularly preferable for at least one of these layers to be provided in the outer region or in the vicinity of the outer region of the covering.

Preferably, the covering forms the outer surface of the wire electrode, and—with the exception of a transition layer, discussed in greater detail further below, that might be present—no further layers are provided between the core and the covering. In certain applications, however, it can also be advantageous to provide one or more further layers on the covering and/or between the core and the covering.

The at least one covering layer comprising β and/or β' brass and γ brass is formed such that the β and/or β' phase and the γ phase are present next to one another, or in parallel, in a fine-grained microstructure, in which the mean grain size of the β and/or β' brass grains and the γ brass grains is 5 μm or less and preferably 3 μm or less in section perpendicular to the longitudinal axis of the wire electrode. In a preferred embodiment, the mean grain size of the β and/or β' brass grains and the γ brass grains is at least 0.1 μm and preferably at least 0.2 μm in section perpendicular to the longitudinal axis of the wire electrode. The γ brass grains are present here for example as a fine precipitation in a matrix of β and/or β' brass. The values given for the mean grain size therefore relate to the totality or combination of the β and/or β' phase and γ phase in the microstructure, i.e. to all grains which belong to one of said phases. Furthermore, the values given for the mean grain size relate to the grain size perpendicular to the longitudinal axis of the wire, i.e. in planes perpendicular to the longitudinal axis of the wire. On account of the cold forming which takes place along the longitudinal axis during production, the grains will generally have greater dimensions in the direction of the longitudinal axis of the wire than perpendicular to the longitudinal axis, and therefore generally larger values will result in longitudinal microsection or grinding.

The mean grain size is preferably determined on the basis of evaluation of scanning electron micrographs of transverse microsections. Here, the production of the transverse microsections can conventionally comprise grinding, polishing and possibly etching. The wire is preferably initially cut transversely to the longitudinal axis thereof with the aid of the ion beam slope cutting process, i.e. the wire is covered in certain portions by a screen and then irradiated with $Ar^+$ ions at the energy 6 keV, as a result of which material is removed from parts of the wire protruding beyond the screen by the ions, and then the wire prepared in this way is fastened conductively using conductive silver to a sample holder, polished in the ion beam and then investigated directly in a scanning electron microscope. The micrographs used are preferably backscattered electron images with a magnification of 2000 to 3000, preferably 2000. The grain sizes can then advantageously be determined on the basis of ASTM E 112 by counting interfaces. For this purpose, squares having an edge length of 10 mm can be placed over the images, for example, and the number of grains within the respective square can be counted, where grains lying on the outer boundary line of the square are to be counted only to an extent of 50%. The mean grain size in the investigated region is then obtained from the following equation:

$$D = \sqrt{\frac{A}{V^2 n}},$$

where D is the mean grain size (diameter of an equivalent grain with a square cross section), A is the surface area of the square, V is the magnification and n is the number of grains in the square determined in the manner described above. The grain size thus determined is then averaged over three squares, for example.

The proportion of the γ phase in the phase mixture is preferably 5 to 80% and more preferably 5 to 50%. Here, in advantageous embodiments, the proportion can be at least 10%.

It has been found that, with a wire electrode of this design, the cutting performance and the erosion resistance are increased considerably at the same time as compared with already known wires. By virtue of the microstructure present in the at least one covering layer comprising β and/or β' brass and γ brass, γ phase is available for promoting the discharge processes in the machining gap, wherein this is, however, adequately bound by the microstructure so as to ensure that it is released in fine doses. In other words, during the erosion process, this prevents relatively large amounts of γ phase, for example in the form of relatively large grains, from being locally completely removed in a short time between the wire electrode and the workpiece, or from being completely detached on account of reduced bonding to the substrate, and therefore from disadvantageously no longer being available elsewhere during the further movement of the respective wire portion through the erosion zone predefined by the workpiece height and the cutting gap width. Moreover, due to the fine-grained microstructure an increased, advantageous number of grain boundaries is present, which can serve as preferred root points for the spark discharge, so that the ignitability in the process and thus in turn the cutting performance are increased.

As compared with a wire electrode comprising an, e.g. outer, covering layer which comprises predominantly relatively large γ phase grains, the wire electrode according to the invention has a higher erosion resistance. It is thereby possible to apply higher generator powers in the form of higher pulse frequencies or currents in order to increase the cutting performance. Furthermore, the reliability against wire breaking, i.e. the process reliability, is increased particularly in the case of relatively high workpieces, and therefore the risk of idle times is advantageously reduced.

The covering can be applied to the core, for example, by suitable coating methods, if appropriate in combination with a heat treatment process. The covering can be applied, for example, by physical or electrochemical means and, if appropriate, this can be followed by further steps for reducing the wire diameter. Thus, for example, it is possible to proceed from an initial material in the form of a wire of Cu, $CuZn_{20}$ or $CuZn_{37}$ having a diameter of e.g. 1 mm, which is coated with Zn, for example by electrodeposition or by hot-dipping. Once the diameter of this coated wire has optionally been reduced to an intermediate dimension with the aid of a wire-drawing device, one-stage or multi-stage diffusion annealing processes follow, in which heat can be introduced by heat radiation, convection or conduction. The annealing can take place, for example, under atmospheric pressure or a protective gas.

The formation of the fine-grained phase mixture of β and/or β' brass and γ brass can advantageously be achieved, for example, by firstly subjecting the wire coated with Zn and optionally drawn to an intermediate dimension to diffusion annealing, in which a covering layer of predominantly γ brass is formed in a targeted manner by an appropriate, known procedure, as described e.g. in EP 0 733 431 B1. To this end, by way of example, the diffusion annealing can be carried out at a heating rate of at least 10° C./s and an annealing temperature of 500 to 800° C. proceeding from a coating of zinc, preferably η zinc, applied below a temperature at which diffusion occurs, with an annealing time in the range of 10 to 300 seconds being selected such that the covering layer of predominantly γ brass or preferably essentially of γ brass is produced, and then cooling takes place at at least 10° C./s. This is followed by a second diffusion annealing, in which the γ brass is first converted at temperatures of above 600° C. into a very zinc-rich β brass having a zinc proportion of preferably at least 51% by weight or substantially into a very zinc-rich β brass having a zinc proportion of preferably at least 51% by weight.

During the cooling, fine regions of γ brass are then precipitated from the supersaturated β solid solution. The heating rate is preferably at least 10° C./s, the annealing time is preferably in the range of 5 to 200 s and the cooling rate is preferably at least 10° C./s. The above annealing times here refer to the period of time between the start and end of the heat supply. It is optionally possible for one or more further Zn coating steps and/or one or more further diffusion annealing processes to then follow, before the wire is drawn into its final dimension. It is possible for the wire to be drawn before, during or after one of the above cooling processes.

In a preferred embodiment, at least one or preferably all of the at least one covering layer comprising β and/or β' brass and γ brass is or are formed from β and/or β' brass and γ brass to an extent of at least 50% by weight. In particular, at least one or all of the at least one covering layer containing β and/or β' brass and γ brass can consist or consist essentially of β and/or β' brass and γ brass.

In an advantageous multi-layered configuration of the covering, provision is made of one or more covering layers which are formed from β and/or β' brass, α+β and/or α+β' brass, α brass and/or copper to an extent of at least 50% by weight and preferably completely or substantially completely and are arranged between the core and the at least one covering layer containing β and/or β' brass and γ brass. It is preferable for all covering layers containing β and/or β' brass and γ brass to be arranged radially outside all of the covering layers which are formed from β and/or β' brass, α+β and/or α+β' brass, α brass and/or copper to an extent of at least 50% by weight.

In one of these multi-layered configurations, the covering can, for example, advantageously comprise one or more first covering layers which are formed from β and/or β' brass and/or α+β and/or α+β' brass to an extent of at least 50% by weight and preferably completely or substantially completely and are arranged between the core and the at least one covering layer containing β and/or β' brass and γ brass. It is again preferable here for all covering layers containing β and/or β' brass and γ brass to be arranged radially outside all of the first covering layers. For example, it is possible to select an advantageous configuration in which the covering comprises, or consists essentially of, a covering layer lying further to the outside, which is formed predominantly or completely or substantially completely from β and/or β' brass and γ brass, and a covering layer which is arranged between this covering layer lying further to the outside and the core and is formed predominantly or completely or substantially completely from β and/or β' brass and/or α+β and/or α+β' brass, i.e. a first covering layer. It is preferable for the microstructure of one or more and preferably all of these first covering layers to be more coarse-grained than that of the at least one covering layer comprising β and/or β' brass and γ brass. By providing a first layer between the core and a covering layer containing β and/or β' brass and γ brass, it is possible to increase the overall strength of the covering layer and to thereby further increase the resistance to wear or erosion. It has been found that merely increasing the layer thickness of the covering layer containing β and/or β' brass and γ brass leads to a decrease in the electrical conductivity and the tensile strength of the wire electrode, which in turn has a disadvantageous effect on the cutting performance and the process reliability.

In conjunction with this embodiment, it is furthermore preferable for the covering to comprise one or more second covering layers, which are each formed from α brass and/or copper to an extent of at least 50% by weight and preferably completely or substantially completely and are arranged between the core and the at least one first covering layer. It is preferable here for all first covering layers to be arranged radially outside all second covering layers and for all covering layers comprising β and/or β' brass and γ brass to be arranged radially outside all first covering layers. A second covering layer can be advantageous, in particular if a core material having moderate eroding properties is selected, such as e.g. steel or copper, since it serves as an additional wear reserve, but can contribute to an increased extent to the tensile strength compared to a covering layer which contains α+β and/or α+β' brass or comprises β and/or β' brass and γ brass. Such a layer may possibly also be present due to the production, if for example said composition is obtained on account of diffusion processes between a copper core or a copper-plated steel core and the first covering layer.

In a further multi-layered configuration, the covering can comprise, for example, an outer covering layer which preferably forms part of the outer surface or the entire outer surface of the covering layer in the form of a top layer and is formed from zinc, a zinc alloy or zinc oxide to an extent of at least 50% by weight and preferably completely or substantially completely. Such an outer covering layer is advantageous within the context of fine finishing processes with small discharge energies, since the zinc is then available more quickly. In the case of higher discharge energies, the layer is removed quickly by contrast and contributes only insignificantly to the eroding process. The outer covering layer preferably has a thickness of 0.1 to 3 μm.

In a preferred multi-layered configuration, the covering is constructed from one or more of the above-defined first covering layers, one or more of the above-defined covering layers containing β and/or β' brass and γ brass and the above-defined outer covering layer provided in the form of a top layer. In particular, the covering can advantageously be constructed from a first covering layer, a covering layer comprising β and/or β' brass and γ brass and the outer covering layer.

In a further preferred multi-layered configuration, the covering is constructed from one or more of the above-defined first covering layers, one or more of the above-defined second covering layers, one or more of the above-defined covering layers containing β and/or β' brass and γ brass and the above-defined outer covering layer provided in the form of a top layer. In particular, the covering can advantageously be constructed from a first covering layer, a second covering layer, a covering layer comprising β and/or β' brass and γ brass and the outer covering layer.

It is preferable for the core to be formed predominantly and preferably completely or substantially completely from copper or a copper-zinc alloy having a zinc content of 2 to 40% by weight. Such cores are advantageously readily cold formable.

In a preferred configuration, the mean contribution of the thickness of the covering to the total thickness of the wire electrode is in the range of 2% to 30% and preferably in the range of 5 to 20% along the entire length of the wire electrode. If the covering is too thin, sufficient erosion resistance is not achieved. In the case of excessively thick coverings, it is harder to carry out processing by cold forming, and furthermore the tensile strength and the electrical conductivity of the wire electrode are reduced on account of the rising proportion of brittle phases.

Preferred diameters of the wire electrode are in a range of 0.1 to 0.4 mm.

The covering surrounding the core—depending on the application—can both be formed in a closed manner and have cracks or discontinuities, i.e. the covering can cover the core completely or substantially completely or else only partially. Similarly, in the case of multi-layered configurations of the covering, each covering layer can both be formed in a closed manner and have cracks or discontinuities, i.e. it can cover the covering layer lying underneath it or the core completely or substantially completely or else only partially. This relates in particular to each of the aforementioned covering layers. In the case of multi-layered coverings, too, with that said the core may not be completely covered and may be visible at some locations. Thus, by way of example, the production of the wire electrode by cold drawing processes may lead to the occurrence of cracks and spalling in the top layer and one or more of the underlying covering layers. Furthermore, said cold drawing processes lead to distortion in the covering layer or the covering layers, and therefore as a whole the interfaces between adjacent covering layers or between the wire core and the overlying covering layer will generally not be formed in an ideal manner, but instead can be irregular and/or "indistinct" because of diffusion processes. Also the core material may penetrate as far as the wire surface as a result of the distortion.

In a preferred configuration, a transition layer which comprises, and preferably consists or consists essentially of, one or more elements of the core material and one or more elements of the covering is arranged between the core and the covering. In general, a corresponding transition layer will already form over the course of the production of the wire electrode and in particular of the covering. In addition to or instead of such a production-related transition layer, it is also possible to produce one or more transition layers in a targeted manner. The transition layer or the transition layers serves or serve to ensure a sufficiently permanent bond between the core and the covering.

As a whole, it should be pointed out that transition zones which can form a transition layer may be present between adjacent covering layers generally compulsorily as a result of production, for example as a result of the diffusion processes already mentioned. If it is mentioned within the context of this application that the covering is constructed from specific layers, this accordingly does not preclude the presence of such transition layers.

The invention is explained in more detail in the following on the basis of exemplary embodiments and with reference to the drawings.

Figure 1:
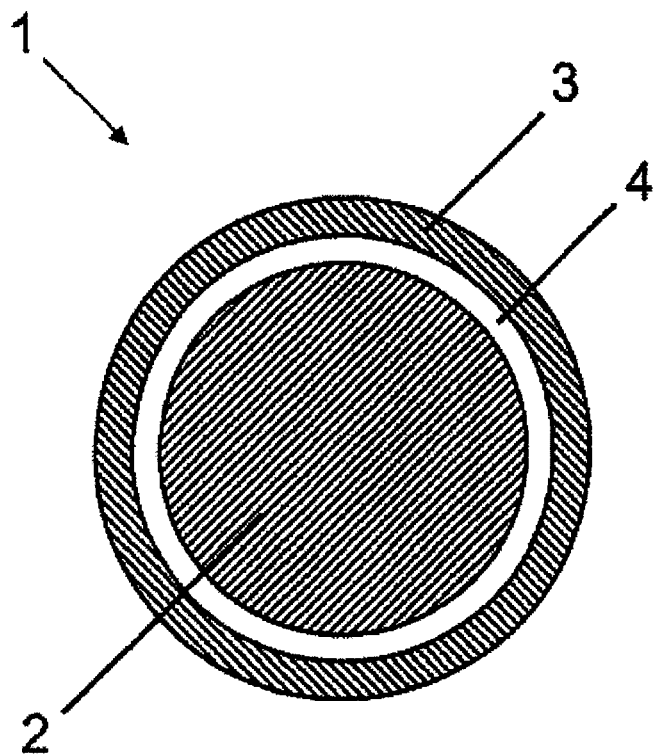
FIG. 1 shows, schematically and not true-to-scale, a cross section of a first embodiment of the wire electrode according to the invention.

The wire electrode 1 shown in cross section in FIG. 1 comprises a core wire 2, which is surrounded or encompassed completely by a covering 3, 4 which forms the outside of the wire electrode 1. In the exemplary embodiment shown, the core is formed homogeneously completely or substantially completely from copper or a copper-zinc alloy having a zinc content of preferably 2 to 40% by weight. The covering 3, 4 is composed of two partial or covering layers 3 and 4, which are arranged one on top of another and are each formed from brass to an extent of more than 50% by weight and preferably completely or substantially completely. In specific cases, it can generally be advantageous to form the wire electrode 1 such that the composition of the core 2 and/or of the covering and/or of individual covering layers varies in the radial direction. In the case of the covering, this can be realized not only by multi-layered configurations, but also by continuous variations within individual covering layers.

The covering layer 3 lying further to the outside consists predominantly, i.e. to an extent of more than 50% by weight, and preferably completely or substantially completely of a mixture of firstly β and/or β' brass and secondly γ brass, wherein the β and/or β' phase and the γ phase are present next to one another, or in parallel, in a fine-grained microstructure, in which the mean grain size of the β and/or β' brass grains and the γ brass grains, i.e. the grain size averaged over all the grains belonging to said phases mentioned, is 0.1 to 5 μm perpendicular to the longitudinal axis of the wire.

The further covering layer 4 is arranged between the covering layer 3, which forms the outer surface of the wire electrode 1 in the exemplary embodiment in FIG. 1, and the core 2. The covering layer 4 can advantageously consist predominantly, i.e. to an extent of at least 50% by weight, and preferably completely or substantially completely of β and/or β' brass, α+β and/or α+β' brass, α brass and/or copper, where β and/or β' brass, α+β and/or α+β' brass are preferred. It may also be advantageous to replace the covering layer 4 with two covering layers arranged one on top of another, wherein the covering layer which adjoins the core is formed predominantly and preferably completely or substantially completely from α brass and/or copper and the covering layer arranged thereontop is formed predominantly and preferably completely or substantially completely from β and/or β' brass, α+β or α+β' brass.

In addition, a transition layer (not shown) which likewise completely surrounds the core 2 can be arranged between the covering 3, 4 and the core 2, said transition layer containing at least one element which is present in the core 2 and at least one element which is present in the covering layer 4. Said transition layer preferably contains an alloy which, in terms of its composition, lies between that of the core 2 and that of the covering layer 4. Here, the composition can also vary in the radial direction in order to bring about a gradual transition between the core 2 and the covering layer 4. Such a transition layer serves for an improved bond between the core 2 and the covering layer 4. Depending on the production method used for the wire electrode 1, a more or less extensive transition layer will generally already be produced inherently, for example as a result of diffusion processes. Such a transition layer will have a small thickness compared to the covering 3, 4.

It should be pointed out that as a whole the interfaces between adjacent layers will generally not be formed in an ideal manner, but instead can be irregular and/or "indistinct" because of diffusion processes. As has already been indicated above, the course of the layers or of the interfaces may also be so irregular, compared to that shown in the drawings, depending on the production method, that individual layers or a plurality of layers lying one on top of another are "punctuated" at some locations by underlying layers or the core. In particular, the covering 3, 4 and/or individual covering layers 3, 4 and/or a possibly present transition layer can be configured such that they have cracks or discontinuities and do not cover the core or underlying layers completely.

In a particular preferred example of this embodiment, the core 2 is formed from $CuZn_{37}$, the covering layer 4 which adjoins the core is formed predominantly from β or β' brass having a zinc content of about 48% by weight, and the covering layer 3 which forms the outer surface of the wire electrode 1 is formed predominantly from a phase mixture of β or β' brass and γ brass having a mean zinc content of about 55% by weight. The mean layer thickness of the covering layer 4 is about 8 μm, the mean layer thickness of the covering layer 3 is about 15 μm, and the thickness of the entire wire electrode 1 is 0.25 mm. The wire electrode 1 has a tensile strength of about 800 $N/mm^2$ and an electrical conductivity of about 12 $m/\Omega mm^2$. A possible transition layer between the core and the covering 3, 4 could have a thickness of about 1 μm, for example.

Figure 2:
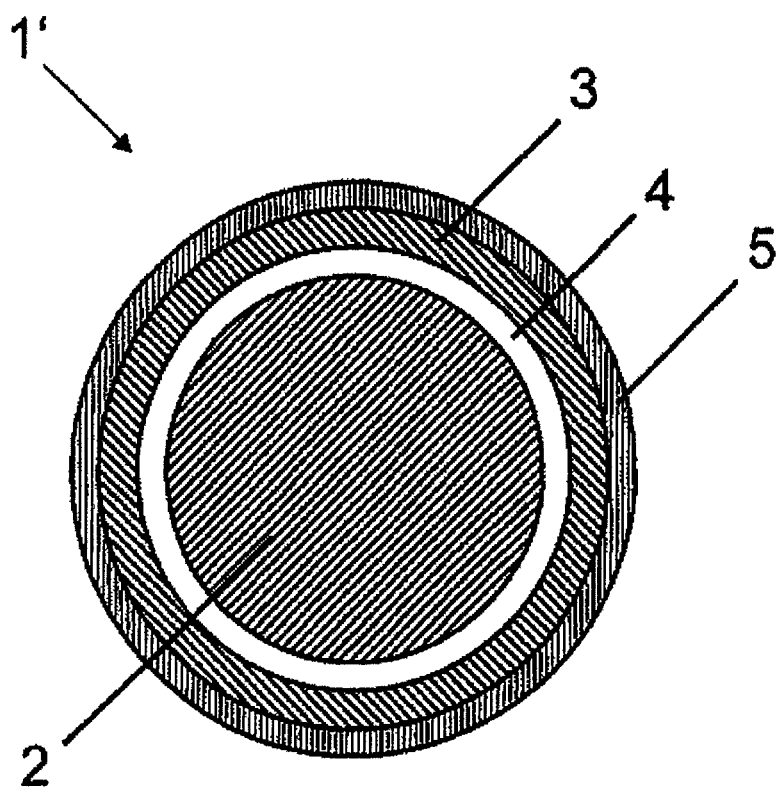
FIG. 2 shows, schematically and not true-to-scale, a cross section of a second embodiment of the wire electrode according to the invention.

In FIG. 2 a further preferred embodiment of a wire electrode 1' is shown in cross section. In principle, this embodiment differs from the embodiment according to FIG. 1 only in that a top layer 5 is also provided on the covering layer 3 as outermost covering layer, said top layer being formed predominantly and preferably completely or substantially completely from zinc, a zinc alloy and/or zinc oxide. It should advantageously have a higher zinc content than the covering layer 3 and can then have a beneficial influence on fine finishing processes with small discharge energies. Here, the top layer 5 can have a considerably smaller thickness than the covering layer 3 and greater discontinuities. If appropriate, the outer surface of the wire electrode 1' can therefore be formed substantially by the covering layer 3 and the top layer 5.

In a particular preferred example of this embodiment according to FIG. 2, the core 2 is formed from $CuZn_{20}$, the covering layer 4 which adjoins the core is formed predominantly from β or β' brass having a zinc content of about 45% by weight, the covering layer 3 is formed predominantly from a phase mixture of β or β' brass and γ brass having a mean zinc content of about 53% by weight, and the top layer 5 consists predominantly of zinc oxide. The mean layer thickness of the covering layers 3 and 4 is about 12 μm in each case, the mean layer thickness of the top layer 5 is about 1 μm, and the thickness of the entire wire electrode 1' is 0.25 mm. The wire electrode 1' has a tensile strength of about 750 $N/mm^2$ and an electrical conductivity of about 17 $m/\Omega mm^2$. A possible transition layer between the core and the covering 3, 4 could have a thickness of about 1 μm, for example.

The invention claimed is:

1. A wire electrode for cutting by electrical discharge machining, comprising:
    a core which comprises a metal or a metal alloy, and
    a covering which surrounds the core and comprises one or more covering layers, of which at least one contains a first mixture of phases including at least one of β or β' brass and including γ brass,
wherein, in the at least one covering layer that contains the first mixture, the phases are present next to one another in a fine-grained microstructure having a mean grain size of 5 μm or less in section perpendicular to the longitudinal axis of the wire electrode.

2. The wire electrode as claimed in claim 1, wherein the mean grain size is 3 μm or less in section perpendicular to the longitudinal axis of the wire electrode.

3. The wire electrode as claimed in claim 1, wherein the at least one covering layer that contains the first mixture is formed from at least one of β or β' brass and from γ brass to an extent of at least 50% by weight.

4. The wire electrode as claimed in claim 1, wherein the core is formed from copper or a copper-zinc alloy having a zinc content of 2 to 40% by weight.

5. The wire electrode as claimed in claim 1, wherein the mean contribution of the thickness of the covering to the total thickness of the wire electrode is in the range of 2% to 30% along the entire length of the wire electrode.

6. The wire electrode as claimed in claim 1, wherein the covering comprises an outer covering layer, which is formed from zinc, a zinc alloy or zinc oxide to an extent of at least 50% by weight.

7. The wire electrode as claimed in claim 6, wherein the outer covering layer has a thickness of 0.1 to 3 μm.

8. The wire electrode as claimed in claim 6, wherein the covering is composed of:
    the at least one covering layer that contains the first mixture; and
    the outer covering layer.

9. The wire electrode as claimed in claim 1, wherein the covering comprises at least one other covering layer that contains a second mixture, which is formed to an extent of at least 50% by weight from at least one phase selected from the group of phases consisting of:
    at least one of β or β' brass;
    α+β or α+β' brass;
    α brass; and
    copper,
wherein the at least one other covering layer is arranged between the core and the at least one covering layer that contains the first mixture.

10. The wire electrode as claimed in claim 9, wherein the at least one other covering layer includes at least one first covering layer formed to an extent of at least 50% by weight from at least one phase selected from the group of phases consisting of:
    at least one of β or β' brass; and
    –α+β or α+β' brass,
wherein the at least one first covering layer is arranged between the core and the at least one covering layer that contains the first mixture.

11. The wire electrode as claimed in claim 10, wherein the microstructure of the at least one first covering layer is more coarse-grained than the microstructure of the at least one covering layer that contains the first mixture.

12. The wire electrode as claimed in claim 10, wherein the covering comprises an outer covering layer, which is formed from zinc a zinc allo or zinc oxide to an extent of at least 50% by weight, and the covering is composed of the at least one first covering layer, the at least one covering layer that contains the first mixture and the outer covering layer.

13. The wire electrode as claimed in claim 12, wherein the outer covering layer has a thickness of 0.1 to 3 μm.

14. The wire electrode as claimed in claim 10, wherein the at least one other covering layer includes at least one second covering layer formed from at least one of α brass or copper to an extent of at least 50% by weight and is arranged between the core and the at least one first covering layer.

15. The wire electrode as claimed in claim 14, wherein the covering comprises an outer covering layer, which is formed from zinc a zinc allo or zinc oxide to an extent of at least 50% by weight, the covering is composed of the at least one first covering layer, the at least one second covering layer, the at least one covering layer that contains the first mixture and the outer covering layer.

16. The wire electrode as claimed in claim 15, wherein the outer covering layer has a thickness of 0.1 to 3 μm.

17. A method for producing a wire electrode having a core and a covering which surrounds the core, the method comprising:
- coating the core with zinc, wherein the core comprises copper or brass;
- forming the covering, including using diffusion annealing to form a covering layer consisting predominantly of γ brass;
- performing a further diffusion annealing step, in which the γ brass is substantially converted into a β brass having a zinc content of at least 51% by weight at temperatures above 600° C.; and
- cooling the wire, in which case fine regions of γ brass are precipitated from the supersaturated β solid solution.

18. The method as claimed in claim 17, wherein the heating rate is at least 10° C./s, the annealing time is 5 to 200 s and the cooling rate is at least 10° C./s.

* * * * *

UNITED STATES PATENT AND TRADEMARK OFFICE
CERTIFICATE OF CORRECTION

PATENT NO. : 8,853,587 B2  Page 1 of 1
APPLICATION NO. : 13/132291
DATED : October 7, 2014
INVENTOR(S) : Baumann et al.

It is certified that error appears in the above-identified patent and that said Letters Patent is hereby corrected as shown below:

In the Claims,

In column 10, line 54, in Claim 12, delete "zinc" and insert --zinc,--, therefor (first occurrence)

In column 10, line 54, in Claim 12, delete "allo" and insert --alloy--, therefor In column 10, line 67, in Claim 15, delete "zinc" and insert --zinc,--, therefor (first occurrence)

In column 10, line 67, in Claim 15, delete "allo" and insert --alloy--, therefor In column 11, line 1, in Claim 15, after "weight,", insert --and--, therefor Signed and Sealed this
Seventeenth Day of February, 2015

Michelle K. Lee
*Deputy Director of the United States Patent and Trademark Office*